(12) United States Patent
Svara et al.

(10) Patent No.: US 10,280,999 B2
(45) Date of Patent: May 7, 2019

(54) DAMPER ASSEMBLIES

(71) Applicant: Titus d.o.o. Dekani, Dekani (SI)

(72) Inventors: Valter Svara, Izola (SI); Danijel Kozlovic, Dekani (SI); David Pecar, Pobegi (SI)

(73) Assignee: Titus d.o.o. Dekani, Dekani (SI)

( * ) Notice: Subject to any disclaimer, the term of this patent is extended or adjusted under 35 U.S.C. 154(b) by 0 days.

(21) Appl. No.: 14/888,805

(22) PCT Filed: Apr. 28, 2014

(86) PCT No.: PCT/EP2014/058619
§ 371 (c)(1),
(2) Date: Nov. 3, 2015

(87) PCT Pub. No.: WO2014/177521
PCT Pub. Date: Nov. 6, 2014

(65) Prior Publication Data
US 2016/0076618 A1    Mar. 17, 2016

(30) Foreign Application Priority Data

May 3, 2013    (GB) .................................. 1308054.4

(51) Int. Cl.
*F16F 9/52*    (2006.01)
*E05F 3/12*    (2006.01)
*E05F 5/10*    (2006.01)

(52) U.S. Cl.
CPC .................. *F16F 9/52* (2013.01); *E05F 3/12* (2013.01); *E05F 5/10* (2013.01); *E05Y 2900/20* (2013.01)

(58) Field of Classification Search
CPC ........ F16F 9/52; F16F 9/3405; F16F 2222/02; F16F 2228/002
USPC .................... 188/316, 317, 322.15
See application file for complete search history.

(56) References Cited

U.S. PATENT DOCUMENTS

| | | | | |
|---|---|---|---|---|
| 2,909,248 A | * | 10/1959 | Gies | F16F 9/52 137/468 |
| 3,577,157 A | * | 5/1971 | Robinson | G06G 5/00 188/317 |
| 3,791,494 A | | 2/1974 | McNally | |
| 3,958,672 A | * | 5/1976 | Keilholz | F16F 9/52 188/277 |
| 4,148,111 A | | 4/1979 | Lieberman | |
| 4,560,041 A | * | 12/1985 | Wossner | F16F 9/52 188/278 |

(Continued)

FOREIGN PATENT DOCUMENTS

DE    1584236 A1    7/1970
DE    10228510 A1    1/2004

(Continued)

*Primary Examiner* — Thomas W Irvin
(74) *Attorney, Agent, or Firm* — Alan D. Kamrath; Kamrath IP Lawfirm, P.A.

(57) ABSTRACT

A damper assembly includes a cylinder (10) having a piston assembly (14) mounted for reciprocal movement therein. The piston assembly (14) divides the cylinder (10) into separate chambers with a restricted flow path therebetween for passage of damping fluid contained within the cylinder. The restricted flow path is defined between elements whose shape and/or relative position is designed to vary with temperature.

18 Claims, 3 Drawing Sheets

(56) References Cited

U.S. PATENT DOCUMENTS

| | | | | |
|---|---|---|---|---|
| 4,573,238 | A | * | 3/1986 | Phillips ................... E05F 3/102 137/513.5 |
| 4,721,130 | A | * | 1/1988 | Hayashi ................ F16F 9/3485 137/493.8 |
| 4,799,577 | A | * | 1/1989 | de Carbon ............. F16F 9/466 188/277 |
| 4,973,024 | A | * | 11/1990 | Homma ................ F16K 31/002 137/594 |
| 5,106,065 | A | * | 4/1992 | Staton ................... F16F 9/0209 188/269 |
| 5,967,268 | A | * | 10/1999 | de Molina ................ F16F 9/52 188/266.5 |
| 8,590,676 | B2 | * | 11/2013 | Morita ..................... F16F 9/34 188/276 |
| 9,360,076 | B2 | * | 6/2016 | Svara ................... F16F 9/3228 |
| 9,371,883 | B2 | * | 6/2016 | Wehr ....................... F16F 9/52 |
| 2006/0185947 | A1 | * | 8/2006 | Mintgen .................. F16F 9/52 188/277 |
| 2014/0151169 | A1 | * | 6/2014 | Wehr ....................... F16F 9/52 188/269 |
| 2015/0014107 | A1 | * | 1/2015 | Svara ................... F16F 9/3405 188/317 |
| 2015/0096854 | A1 | * | 4/2015 | Svara ................... F16F 9/3228 188/313 |

FOREIGN PATENT DOCUMENTS

| | | |
|---|---|---|
| GB | 1221449 A | 2/1971 |
| GB | 2156950 A | 10/1985 |

* cited by examiner

DAMPER ASSEMBLIES

This invention relates to damper assemblies and, in particular, though not exclusively, to damper assemblies for cushioning movement of furniture parts such as doors or drawers.

The invention provides a damper assembly having a cylinder with a piston assembly which is mounted for reciprocal movement therein and which divides the cylinder into separate chambers with a restricted flow path therebetween for passage of damping fluid contained within the cylinder. The restricted flow path is defined between elements whose shape and/or relative position is designed to vary with temperature.

Figure 1:
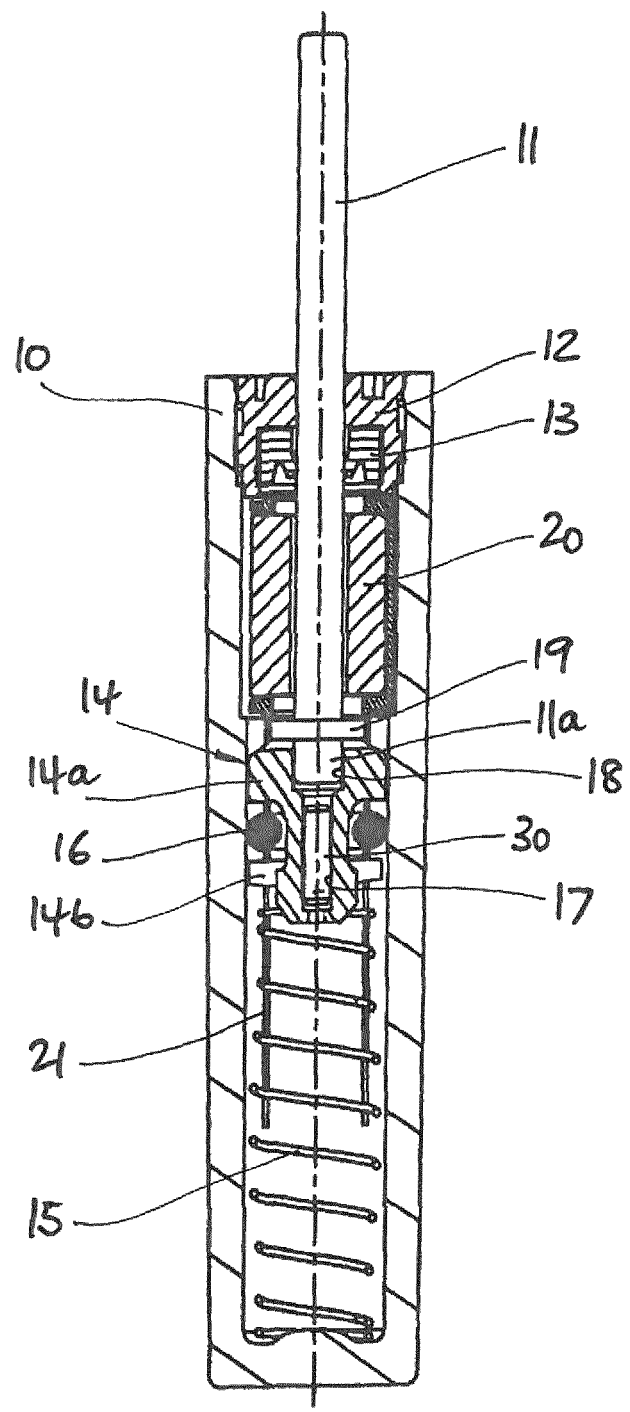
Figure 2:
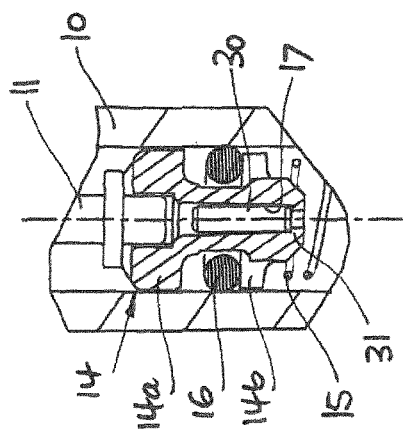
Figure 3:
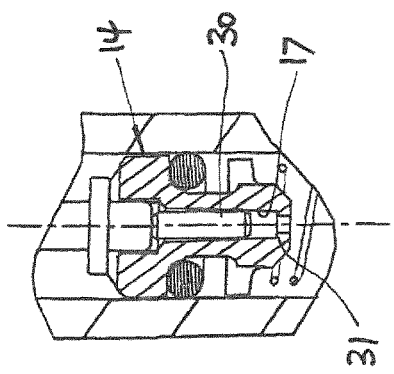
Figure 4:
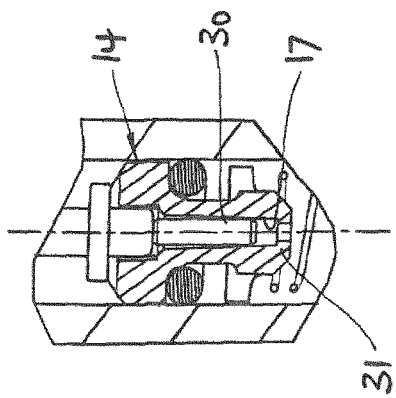
Figure 5:
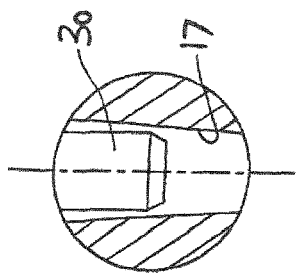
Figure 6:
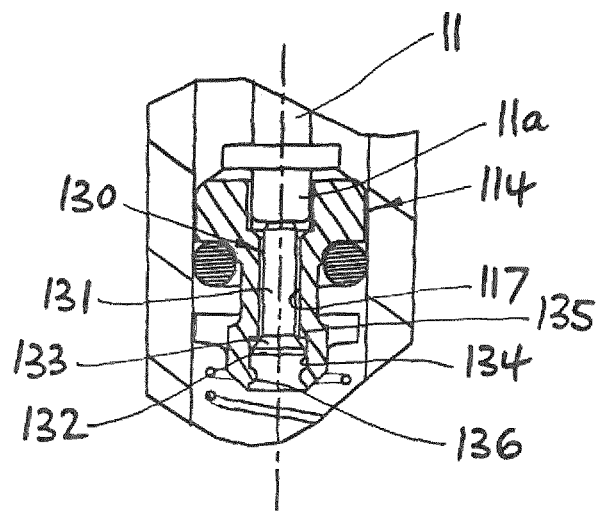
Figure 8:
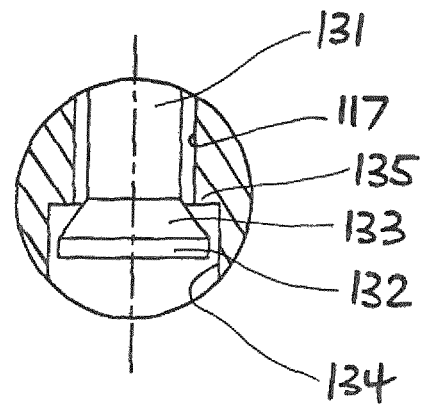
Figure 7:
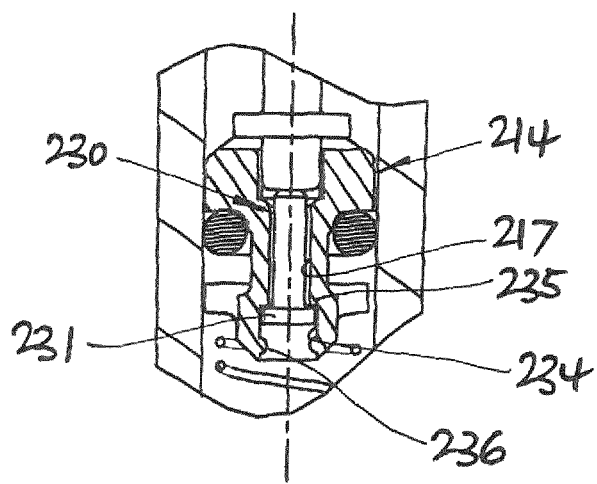
Figure 9:
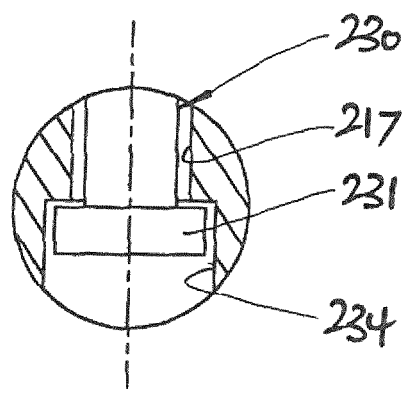

By way of example, embodiments of the invention will now be described with reference to the accompanying drawings, in which:

FIG. 1 is a cross-sectional view of a damper assembly according to the invention, FIGS. 2, 3 and 4 are cross-sectional views of the piston assembly of the FIG. 1 assembly in various different conditions, FIG. 5 is a detail from the piston assembly of FIG. 1, FIGS. 6 and 7 are cross-sectional views of other forms of piston assembly for the damper assembly of FIG. 1, and FIGS. 8 and 9 are details from the piston assemblies of FIGS. 6 and 7 respectively.

The damper assembly seen in FIG. 1 comprises an elongate cylinder 10 which is closed at one end, and a piston rod 11 arranged for reciprocal movement along the longitudinal axis of the cylinder. The piston rod 11 is conveniently formed from plain rod stock of circular cross-section. The cylinder 10 is conveniently of plastics.

The piston rod 11 extends into the cylinder 10 through a hole in an end cap 12 and is surrounded by a seal 13. The end cap 12 is fixed to the cylinder 10 and seals off its open end, thus creating an enclosed inner space within the cylinder. The inner space contains a damping fluid such as oil.

At its inner end, the piston rod 11 is designed to engage a piston assembly 14. The piston assembly 14 is conveniently made of plastics and effectively divides the inner space within the cylinder 10 into separate chambers. A compression spring 15 arranged in one of the chambers between the closed end of the cylinder 10 and the piston assembly 14 acts to bias the piston rod 11 towards its extended position (seen in FIG. 1).

The piston assembly 14 comprises outer and inner flanges 14a, 14b. The outer diameter of the flanges 14a, 14b is slightly less than the bore of the cylinder 10. This means that the piston assembly 14 is able to move freely within the cylinder 10 along its longitudinal axis. It also means that there is a small gap between the flanges 14a, 14b and the cylinder 10, which constitutes a pathway for the passage of damping fluid between the chambers.

The flanges 14a, 14b are spaced apart axially, and in the space between them is located a seal 16, preferably in the form of an O-ring. The seal 16 is in sealing engagement with the bore of the cylinder 10, but not with the piston assembly 14.

The piston assembly 14 has a hole 17 therethrough, to allow a fluid communication pathway between the chambers. An elongate pin 30 is located within the hole 17. This arrangement provides a controlled restricted flow path for passage of damping fluid across the piston assembly, as is described in greater detail below.

On the outer flange 14a of the piston assembly 14, the hole 17 has a counterbore 18. As will be seen, the counterbore 18 is designed to receive an inner end section 11a of the piston rod 11. The inner end section 11a is arranged to be received in the counterbore 18 with an interference fit. This arrangement means that the piston assembly is able to provide lateral support for the piston rod at its inner end in its reciprocal movement within the cylinder 10.

The counterbore 18 is provided with one or more axially extending grooves (not shown) on its inner surface. The purpose of these grooves is to provide communication across the piston assembly 14 to allow passage of damping fluid between the chambers. The passageway provided by this means is designed to be greater than the restricted flow path defined between the pin 30 and hole 17, to ensure that this latter restricted flow path will act as the damping control mechanism.

A collar 19 is seen on the piston rod 11 towards its inner end. The collar 19 is preferably of metal and is formed on or attached to the piston rod 11 by suitable means such as stamping or moulding. The purpose of the collar 19 is to spread the load on the piston assembly 14 when a force, e.g. from a closing door, acts on the piston rod 11. This is an important consideration, because the fluid pressures that occur in damper assemblies of this nature can be quite substantial and plastics components can distort and break or jam in the cylinder if they are not adequately supported.

The collar 19 is designed to engage the axial end face of the outer flange 14a with its annular surface. The cross-sectional area of the annular surface of the collar 19 is at least twice as big as the cross-sectional area of the piston rod 11, and preferably four or five times as big.

A resiliently collapsible element 20 of known design is contained within one of the chambers. The purpose of this element 20 is to compensate for changes in volume in the cylinder 10 that result from movements of the piston assembly 14.

The cylinder 10 has a number of relief channels 21 extending axially in the surface of its bore. The channels 21 are arranged to taper in depth towards the closed end of the cylinder 10, i.e. their depth decreases progressively in this direction. The purpose of these channels 21 is to allow a progressively variable amount of fluid communication between the chambers as the piston assembly 14 moves axially within the cylinder 10 and hence to produce a progressive variation in the damping resistance provided by the assembly.

In operation, the assembly will normally be in the position seen in FIG. 1, with its piston rod 11 fully extended from the cylinder 10. When the distal end of the piston rod 11 is struck, e.g. by a closing door, this will cause the piston rod 11 to force the piston assembly 14 towards the closed end of the cylinder 10, against the bias of the spring 15. At the same time, the outer flange 14a of the piston assembly 14 will move into engagement with the seal 16, thus closing off the fluid pathway between the outer flange and the cylinder 10. Mainly, therefore, fluid moving across the piston assembly 14 from one chamber to the other has to pass through the hole 17. A certain amount of fluid is also able to leak between the two chambers via the relief channels 21, However, the amount of leakage of fluid by this means is arranged to decrease over the working stroke of the piston assembly 14, due to the tapering form of the channels 21. Accordingly, the main factor that determines the magnitude of the damping force that the assembly will exert on its working stroke is the size of the gap between the hole 17 and the pin 30 located within it.

When the force on the distal end of the piston rod 11 has dissipated, the piston rod will be returned to its extended position by the biasing force of the spring 15 acting on the piston assembly 14. This movement moves the seal 16 from its engagement with the outer flange 14a of the piston assembly 14 into engagement with the inner flange 14b. In this position, a far greater degree of fluid communication is opened up between the two chambers. This greatly eases the flow of damping fluid across the piston assembly 14, and, thus, means that on the return movement of the piston rod 11, there is little effective damping resistance.

The piston assembly 14 is seen in greater detail in FIG. 2. It will be seen that the hole 17 has a reduced diameter section which produces a shoulder 31 at the inner end of the piston assembly 14. The effect of this is to capture the elongate pin 30 in the hole 17 between the shoulder 31 and the inner end of the piston rod 11. The length of the pin 30 is somewhat less than the extent of the hole 17 between the shoulder 31 and the inner end of the piston rod 11. This means that the pin 30 is able to move axially within the hole 17 between end positions.

It will also be seen that the hole 17 is not cylindrical, but tapering towards the inner end of the piston assembly 14. This means that the pin 30 is effectively located within an open-ended conical chamber. The end of the pin 30 within the conical chamber defined by the hole 17 can be seen in FIG. 5.

FIG. 2 shows the condition of the piston assembly 14 after the spring 15 has returned the piston rod 11 to its normally extended position. In this condition, the pin 30 is in its innermost axial end position, located on the shoulder 31 of the hole 17. In this position, the gap between the pin 30 and the hole 17 is at is smallest. It will also be noted that the seal 16 in this condition of the piston assembly 14 is located on the inner flange 14b.

FIG. 3 shows the condition of the piston assembly 14 when the piston rod 11 experiences an impact, e.g. from a closing door. The piston rod 11 forces the piston assembly 14 further into the cylinder 10 against the biasing action of the spring 15. As the piston assembly 14 moves, it picks up the seal 16, which is in sealing engagement with the bore of the cylinder 10. The seal 16 is now in sealing engagement with the outer flange 14a, thus effectively closing off fluid communication around the outside of the piston assembly 14 (other than via the relief channels, which are not shown here). Inward movement of the piston rod 11 thus sets up a pressure differential across the piston assembly 14, effectively forcing fluid through the hole 17. This flow of fluid causes the pin 30 to move axially in the hole 17 to its opposite end position, abutting against the inner end of the piston rod 11.

The amount of fluid that is able to flow through the hole 17 is governed by the gap between it and the pin 30. As will be understood from FIG. 5, this depends upon the diameter of the pin 30 and the axial position of its inner end along the tapering shape of the hole 17. The position of the inner end of the pin 30 when it is in abutting engagement with the inner end of the piston rod 11 is determined by its length. Depending upon the design of the pin 30, however, and in particular, the material of which it is made, its length will vary with temperature, according to its coefficient of thermal expansion. As the temperature of the pin 30 increases, so its length will increase (and also to some extent its diameter, but less significantly). This phenomenon can be used to provide compensation for temperature changes in the damper assembly.

In use, damper assemblies of this nature can become heated, due to the action of the damping fluid being forced through restricted passageways. Typically, the viscosity of damping fluids tends to decrease as their temperature increases. Accordingly, a rise in temperature in such a damping assembly will tend to result in a decrease in the amount of damping that it is able to generate. The arrangement seen here is able to compensate for such temperature changes.

As will be seen, an increase in the length of the pin 30 due to a rise in temperature will mean that its inner end is nearer the inner end of the hole 17, i.e. further down its taper. This is the condition seen in FIG. 4, which contrasts with the condition seen in FIG. 3. The net effect is that the gap between the pin 30 and the hole 17 is smaller. This gap constitutes the restricted passageway that effectively controls the flow of fluid across the piston assembly 14. The arrangement means, therefore, that as the temperature of the assembly, and hence the pin 30, rises, the pin will expand and thus the effective gap between it and the hole 17 will be reduced. The loss of viscosity in the damping fluid due to its rise in temperature is thus compensated for by the fact that it must now pass through a more restricted passageway.

In the example shown in FIGS. 1 to 5, the pin 30 is in the form of a solid rod of circular cylindrical shape and is of a material, typically plastics, with a suitable coefficient of thermal expansion. It will be understood, however, that many different alternative arrangements are possible. For example, the pin could be made as a thin-walled component, rather than being solid; it could be formed of bi-metal or other material to give a suitable expandability; it could be arranged to expand laterally as well as or instead of axially; or it could itself to made as a conical element. Also the hole in which the pin is located could be designed in different ways. For example, instead of being conical in shape, it could be formed as a cylindrical hole and be provided with axially extending grooves of variable depth, akin to the tapering relief channels in the cylinder described above.

An alternative design of piston assembly 114 is seen in FIG. 6. Here, the piston assembly 114 has an axially extending bore therethrough in the form of a plain cylindrical hole 117. Located within and freely movable in this hole 117 is an elongate pin 130. The pin 130 has a plain cylindrical shank 131 and a larger diameter head 132, with a conical taper 133 in the transition therebetween. The piston assembly 114 has a counterbore 134 at its inner end, arranged co-axially with the hole 117 and thus defining a shoulder 135. The counterbore 134 is sized to receive the head 132 of the pin 130, and a projection 136 retains it in position.

The pin 130 is configured so that when its other end is in abutting engagement with the inner end section 11a of the piston rod 11, its taper 133 will be in close proximity to the shoulder 135, as will be seen in FIG. 8. The gap therebetween determines the effective size of the fluid flow path across the piston assembly 114. In this case, the pin 130 is designed to have a lower coefficient of thermal expansion than the piston assembly 114, conveniently by making the pin of metal and the piston assembly of plastics. Now, if there should be a rise in temperature, eg due to the damper assembly being subjected to a heavy workload, this will result in a proportionately greater axial elongation of the piston assembly 114 than of the pin 130. This will effectively cause the position of the shoulder 135 to move nearer relative to the taper 133, resulting in a diminution of the size of the flow path therebetween. The arrangement is thus able to provide the same effective temperature-dependent compensation as with the previously described example.

The alternative form of piston assembly 214 seen in FIG. 7 is designed to operate in much the same way as the FIG.

6 assembly, with a pin 230 being located in a hole 217 with a counterbore 234 defining a shoulder 235, and with the pin having a lower coefficient of thermal expansion than the piston assembly. The restricted flow path across the piston assembly here is again defined by the gap between the shoulder 235 and the head of the pin 230, but here the pin has a basically flat head 231. The counterbore 234 is sized to receive the head 231 of the pin 230, and a projection 236 retains it in position. Changes in temperature here will again cause differential expansion of the pin and piston assembly, thus effectively altering the gap between the head 231 of the pin 230 and the shoulder 235 and hence the size of the fluid pathway across the piston assembly.

The invention claimed is:

1. A damper assembly comprising:
   a cylinder having a longitudinal axis;
   a piston assembly mounted for reciprocal movement in the cylinder along the longitudinal axis and which divides the cylinder into separate chambers spaced from each other along the longitudinal axis;
   a flow chamber extending through the piston assembly for passage of damping fluid parallel to the longitudinal axis and between the separate chambers;
   an elongated hole having a longitudinal axis coincident with the longitudinal axis of the cylinder and in communication with the flow chamber; and
   an elongate pin freely movable axially relative to the piston assembly and within the elongated hole, wherein the elongate pin is freely moveable axially along a longitudinal axis coincident with the longitudinal axis of the elongated hole and of the cylinder, and wherein a restricted flow path from the flow chamber is defined by an annular gap between the elongated hole and the elongate pin and whose shape and/or relative position has a variation to vary with temperature.

2. A damper assembly as claimed in claim 1 wherein an effective size of the restricted flow path between the flow chamber and the elongate pin reduces as temperature increases.

3. A damper assembly as claimed in claim 1 wherein said variation of the restricted flow path is caused by the effects of thermal expansion in a direction of the longitudinal axis of the cylinder.

4. A damper assembly as claimed in claim 3 wherein the flow chamber has a cross-sectional shape whose area varies with respect to the longitudinal axis of the cylinder.

5. A damper assembly as claimed in claim 4 wherein the flow chamber is conical in shape.

6. A damper as claimed in claim 4 wherein the flow chamber is essentially cylindrical in shape but includes a shoulder.

7. A damper as claimed in claim 6 wherein the elongate pin has an enlarged head.

8. A damper as claimed in claim 7 wherein the enlarged head of the elongate pin is conical.

9. A damper as claimed in claim 3 wherein a cross-sectional shape of the elongate pin varies with respect to the longitudinal axis of the elongate pin.

10. A damper as claimed in claim 9 wherein at least part of the elongate pin is conical in shape.

11. A damper as claimed in claim 1 wherein the hole has a hole axial extent along the longitudinal axis of the elongated hole, wherein the length is shorter than the hole axial extent, with the length being within the hole axial extent, with the length extending between first and second axial ends of the elongate pin, with the first axial end abutting the piston assembly in the first position and spaced from the piston assembly in the second position, with the restricted flow path defined between the second axial end and the elongate hole.

12. A damper as claimed in claim 1 wherein the elongate pin is free of axial connection to the elongated hole and the piston assembly.

13. A damper as claimed in claim 12 wherein the hole has a hole axial extent along the longitudinal axis of the elongated hole, wherein the length is shorter than the hole axial extent, with the length being within the hole axial extent, with the length extending between first and second axial ends of the elongate pin, with the first axial end abutting the piston assembly in the first position and spaced from the piston assembly in the second position, with the annular gap defined between the second axial end and the elongated hole.

14. A damper assembly comprising:
   a cylinder;
   a piston assembly mounted for reciprocal movement in the cylinder and which divides the cylinder into separate chambers spaced from each other;
   a flow chamber extending through the piston assembly for passage of damping fluid between the separate chambers;
   an elongated hole in communication with the flow chamber; and
   an elongate pin freely movable axially relative to the piston assembly and within the elongated hole, wherein the elongate pin has a length relative to the elongated hole to be freely movable axially between a first position abutting with the piston assembly and a second position spaced from the piston assembly, and wherein a restricted flow path from the flow chamber is defined between the elongated hole and the elongate pin and whose shape and/or relative position has a variation to vary with temperature.

15. A damper assembly as claimed in claim 14, wherein:
   the cylinder has a longitudinal axis;
   the piston assembly is mounted for reciprocal movement in the cylinder along the longitudinal axis and divides the cylinder into the separate chambers spaced from each other along the longitudinal axis;
   the flow chamber extends through the piston assembly for passage of damping fluid parallel to the longitudinal axis and between the separate chambers;
   the elongated hole has a longitudinal axis coincident with the longitudinal axis of the cylinder;
   the elongate pin is freely moveable axially along a longitudinal axis coincident with the longitudinal axis of the elongated hole and of the cylinder; and
   the restricted flow path from the flow chamber is defined by an annular gap between the elongated hole and the elongate pin.

16. A damper assembly as claimed in claim 15 wherein the elongate pin is free of axial connection to the elongated hole and the piston assembly.

17. A damper as claimed in claim 16 wherein the hole has a hole axial extent along the longitudinal axis of the elongated hole, wherein the length is shorter than the hole axial extent, with the length being within the hole axial extent, with the length extending between first and second axial ends of the elongate pin, with the first axial end abutting the piston assembly in the first position and spaced from the piston assembly in the second position, with the annular gap defined between the second axial end and the elongated hole.

18. A damper as claimed in claim 14 wherein the elongate pin is free of axial connection to the elongated hole and the piston assembly.

\* \* \* \* \*